June 18, 1957 R. A. ERNST 2,796,182
WAGON UNLOADING JACK
Filed Sept. 5, 1956 2 Sheets-Sheet 1

INVENTOR.
ROBERT A. ERNST
BY
McMorrow, Berman + Davidson
ATTORNEYS

June 18, 1957  R. A. ERNST  2,796,182
WAGON UNLOADING JACK
Filed Sept. 5, 1956  2 Sheets-Sheet 2
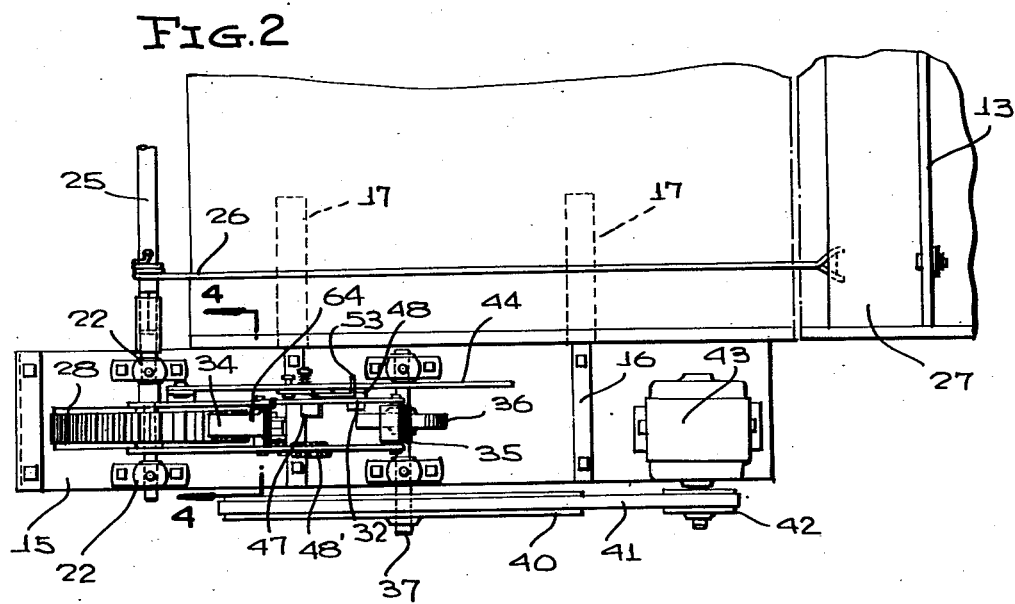
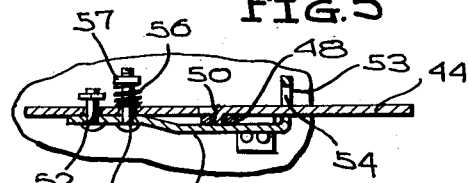
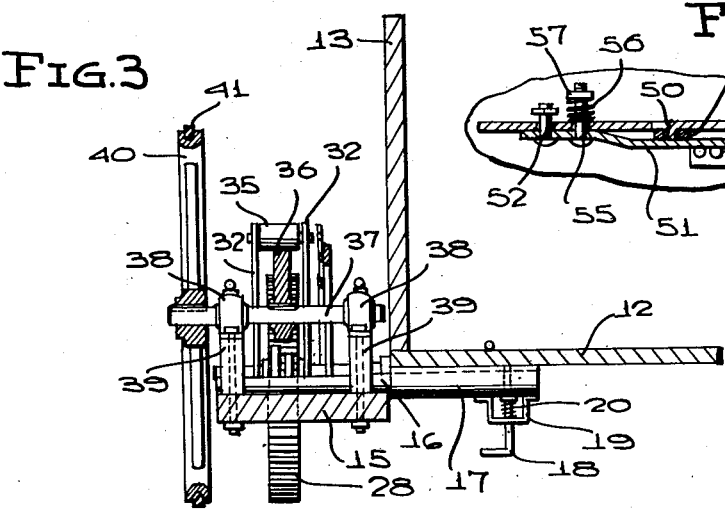
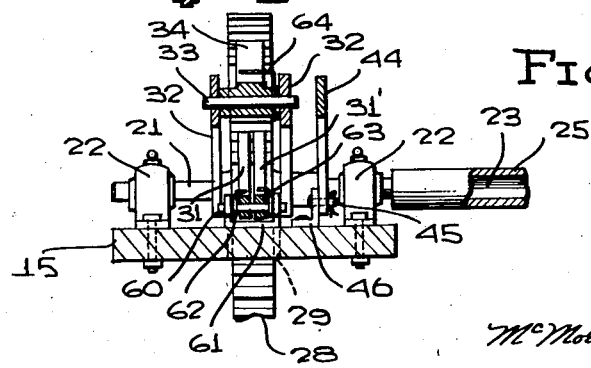
INVENTOR.
ROBERT A. ERNST
BY
McMorrow, Berman + Davidson
ATTORNEYS

2,796,182

WAGON UNLOADING JACK

Robert A. Ernst, Saukville, Wis.

Application September 5, 1956, Serial No. 608,060

1 Claim. (Cl. 214—82)

This invention relates to vehicle bodies, and more particularly to an unloading jack device for a wagon of the type having a bed and a bulkhead wall slidably mounted on said bed and movable rearwardly to discharge the contents of the wagon rearwardly therefrom.

A main object of the invention is to provide a novel and improved jack means for use in actuating the sliding bulkhead wall of a wagon to discharge the contents of the wagon rearwardly therefrom, the jack means being simple in construction, being easy to install on a wagon, and being reliable in operation.

A further object of the invention is to provide an improved unloading jack mechanism for use on a wagon of the type having a bed and a bulkhead wall slidably mounted on the bed and movable rearwardly to discharge the contents of the wagon rearwardly therefrom, the improved jack mechanism involving inexpensive components, being rugged in construction, and providing a means whereby the contents of the wagon equipped therewith may be rapidly and efficiently discharged, with a minimum amount of manual effort on the part of the operator.

Further objects and advantages of the invention will become apparent from the following description and claim, and from the accompanying drawings, wherein:

Figure 2 is a top plan view of the jack structure employed in Figure 1.

Figure 3 is a transverse vertical cross sectional view taken on line 3—3 of Figure 1.

Figure 4 is an enlarged cross sectional detail view taken on line 4—4 of Figure 2.

Figure 5 is an enlarged cross sectional detail view taken on line 5—5 of Figure 1.

Figure 1:
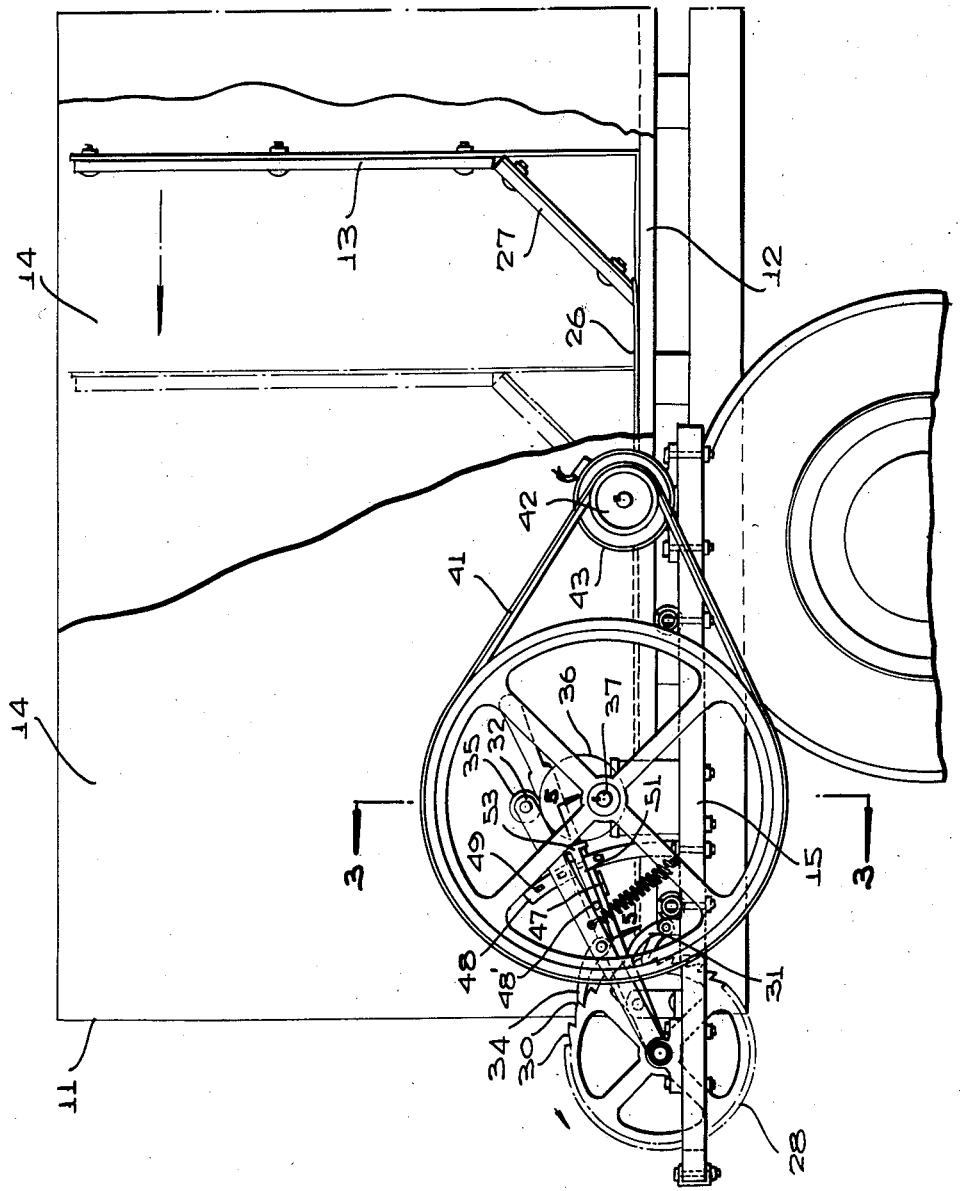
Figure 1 is a fragmentary side elevational view of a wagon provided with an improved unloading jack constructed in accordance with the present invention.

Referring to the drawings, 11 generally designates a wagon having a bed 12 and having a bulkhead wall 13 which is slidably mounted on the bed and which is movable rearwardly to discharge the contents of the wagon rearwardly therefrom. As will be readily understood, the bulkhead wall 13 extends transversely for substantially the entire inside width of the wagon, so that the material loaded in the wagon will be moved rearwardly when the bulkhead wall 13 is moved rearwardly on the bed 12.

The wagon 11 is provided with the opposite side walls 14, 14 between which the transverse bulkhead wall is slidable, as above mentioned. Designated at 15 is a generally rectangular, horizontal, longitudinally extending support plate which is detachably secured to a side marginal portion of the bed 12 adjacent the rear end of the wagon. Thus, as shown in Figure 3, a pair of transversely extending bar members 16, 16 may be secured on the support 15, said bar members 16 projecting laterally substantial distances from the support 15 and being slidably received in sleeve members 17, 17 secured to the underside of the bed 12. The sleeve members 17 may be provided with locking bolts 18 which are mounted in bracket members 19, as shown in Figure 3, and which are biased upwardly through the sleeve members 17 by coil springs 20 engaged between the bight portions of the bracket members 19 and collars fixed to the bolts 18, as shown in Figure 3, the bolts 18 engaging through apertures in the sleeves 17 and through registering apertures in the extensions of the bar members 16 to releasably secure the bar members in the sleeves 17, thus fastening the support member 15 to the side of the bed 12 in the position thereof shown in Figure 3.

Designated at 21 is a transverse shaft which is journaled on suitable bearings 22, 22 provided on the support member 15, the shaft 21 being formed with a squared end portion 23 which telescopically engages in the squared internal bore of a cable shaft 25. Secured to the shaft 25 and wound thereon is a flexible cable 26. The end of cable 26 is fastened in any suitable manner to the slidable bulkhead wall 13.

Thus, the bulkhead wall 13 may be provided with the inclined lower portion 27, and the cable 26 may be secured to the bottom edge of the inclined corner element 27 of the bulkhead wall. Obviously, a pair of cables 26 may be employed on the shaft 25, for example, one cable 26 may be secured on the shaft adjacent the support member 15, and another cable 26 may be secured on the opposite end portion of the cable shaft 25, so that the cables may be fastened to respective side portions of the bulkhead wall 13. This provides an even pull on the lower portions of the bulkhead wall as the cables 26 are wound up on the cable shaft 25.

Secured on the intermediate portion of the shaft 21 is a ratchet wheel 28 which extends through a longitudinal slot 29 formed in the support 15. As shown in Figure 1, the teeth of the ratchet wheel, designated at 30 are directed in a clockwise direction, as viewed in Figure 1, and said teeth are engaged by a pawl member 31 pivoted to the support 15 and preventing clockwise rotation of the ratchet wheel 28. The ratchet wheel 28 is free to rotate counterclockwise, as viewed in Figure 1, namely, in a direction to wind up the cable elements 26 on the cable shaft 25.

Designated respectively at 32, 32 are parallel pawl arms which are pivoted to the shaft 21 and which extend on opposite sides of the ratchet wheel 28. The pawl arms are connected at their intermediate portions by a transverse pin element 33 on which is pivoted a pawl 34 which is engageable with the teeth of the ratchet wheel 28 and which act to rotate the ratchet wheel step-wise in a counterclockwise direction, as will be presently explained, responsive to the oscillation of the lever arms 32, 32. Journaled between the outer ends of the lever arms 32, 32 is a transversely extending roller 35 which engages on the periphery of an eccentric cam 36 secured on a transverse shaft 37 rotatably supported on spaced bearings 38, 38 mounted on upstanding blocks 39, 39 secured to the support 15. Secured on the end of the shaft 37 is a relatively large pulley 40 which is coupled by a belt 41 to a small pulley 42 carried on the shaft of an electric motor 43 mounted on the forward end portion of the support 15. As will be readily apparent, when the large pulley 40 is rotated by the motor 43 through small pulley 42 and belt 41, the eccentric disc 36 rotates therewith and oscillates the pawl lever members 32, 32, whereby the ratchet wheel 28 is rotated in a step-wise fashion counterclockwise, as viewed in Figure 1, thus winding up the cable element 26 on the cable shaft 25 and thus moving the bulkhead wall 13 in a rearward direction to discharge the contents of the wagon.

Means are provided to regulate the stroke of the pawl lever members 32, 32, whereby the rate of rearward movement of the bulkhead wall 13 may be controlled, said means comprising a resilient control lever 44 pivoted at 45 to an angle bracket 46 secured to support 15, said control lever being located adjacent one of the pawl levers 32 and being formed with a rigid transversely extending lug 47 underlying the adjacent pawl lever 32 and being adapted to limit the downward movement of the pawl lever. As shown in Figure 1, a coil spring 48' is connected between one of the pawl levers 32 and the support 15, biasing the pawl levers 32 downwardly. The control lever 44 is adjustably positioned so that said control lever may be set in a desired fixed position with respect to the oscillating levers 32, 32 so as to limit the downward travel of said levers 32, 32 responsive to the rotation of the eccentric disc 36. The positioning means for the control lever 44 comprises an arcuate rigid upstanding bar member 48 which is secured to the support 15 and which extends closely adjacent to the control lever 44, as shown in Figure 5. The arcuate locking bar 48 is formed with a plurality of spaced apertures 49, and the control lever 44 is formed with a lug 50 selectively engageable in the spaced apertures 49. Arm 44 is sufficiently resilient so that it may be flexed sufficiently to disengage the lug 50 from the aperture 49 in which the lug is engaged, to release the arm 44 so that its position of adjustment may be changed. The arm 44 is releasably held in adjusted position by a latch bar 51 loosely secured to the arm 44, as by a loose bolt 52 and having its free end portion formed with an inturned lug member 53 provided with an aperture 54 through which lever 44 extends.

As shown in Figure 5, the locking arm 51 is offset so that the arcuate bar 48 is received between the locking arm 51 and the main body of the control lever 44. A retaining bolt 55 extends loosely through the locking arm 51 and the control lever 44, a coil spring 56 being provided on the retaining bolt, bearing between the control lever 44 and a nut 57 on the bolt 55, biasing the locking arm 51 toward the control lever 44. Thus, the control lever 44 is normally locked in an adjusted position thereof relative to the arcuate fixed bar 48, whereby the lug 47 is normally positioned to limit the oscillation of the pawl levers 32 to a predetermined stroke. The stroke may be increased by lowering the pawl levers 32, whereby a more rapid movement of the discharge bulkhead 13 is obtained, or the stroke may be shortened by elevating the control lever 44, whereby the bulkhead 13 moves at a slower rate. The control lever 44 is unlocked by flexing the lever 44 laterally to disengage the lug 50 from the opening 49, allowing the control lever 44 to be moved to a different position of adjustment.

As shown in Figure 4, the retaining pawl 31 is pivotally mounted on a transverse horizontal pin 60 secured in a U-shaped bracket 61 fastened to the support 15. An auxiliary retaining pawl 31' may be provided on the pin 60, as shown, in side-by-side relationship with the retaining pawl 31 but shorter by a distance equal to one-half the spacing between the teeth 30 on the periphery of the ratchet wheel 28, so that either the retaining pawl 31 or the auxiliary retaining pawl 31' will be effective to hold the ratchet wheel 28 against clockwise movement, as viewed in Figure 1, in all of the various positions of adjustment of the control arm 44.

Suitable coiled biasing springs 62 and 63 are mounted on the pin 60 adjacent the pawls 31 and 31', said springs having end portions bearing on the pawls and having opposite end portions engaging the bracket 61, said springs acting to bias the pawls toward engagement with the ratchet wheel. A similar biasing spring 64 is provided on pin 33, acting between pawl 34 and one of the arms 32 to bias pawl 34 into engagement with the ratchet wheel.

As will be readily understood, the unloading jack mechanism is removed from the wagon after the wagon has been unloaded, so that the wagon may be returned to the field.

While a specific embodiment of an improved wagon unloading jack mechanism has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a wagon having a bed and a bulkhead wall slidably mounted on said bed and movable rearwardly to discharge the contents of said wagon rearwardly therefrom, means for moving said bulkhead wall rearwardly comprising a support mounted on a side portion of the wagon adjacent the rear end of the bed, a transverse cable shaft journaled on said support, a ratchet wheel having a toothed periphery secured on said cable shaft, a pawl lever pivoted to said shaft, a pawl pivoted to said lever and engaging the periphery of said ratchet wheel, a transverse shaft journaled on said support forwardly of said first-named shaft and underlying said lever, a cam disc eccentrically mounted on said second-named transverse shaft beneath said lever and engaging the bottom portion of the lever, whereby said lever is oscillated responsive to rotation of said second-named shaft, a motor mounted on said support, means drivingly coupling said motor to said second-named shaft, an upstanding arm secured to said support adjacent said lever, a resilient control lever pivoted to said support adjacent said first-named lever, a rigid transversely extending lug on said control lever underlying said first-named lever to limit downward return movements thereof, an upstanding, multiple-apertured arm secured to said support adjacent said control lever, a projection on said control lever engageable in a selected aperture of said arm for adjustably securing said control lever to said upstanding arm, whereby the magnitude of the return stroke of the first-named lever may be adjusted, spring means biasing the first-named lever downwardly, a cable secured to said cable shaft and to said bulkhead wall, and a retaining pawl pivoted to said support and being engageable with the toothed periphery of said ratchet wheel.

References Cited in the file of this patent

UNITED STATES PATENTS 2,640,613   Kuhl _____ June 2, 1953